United States Patent
Johnson

[15] 3,659,513
[45] May 2, 1972

[54] SELF-COCKING PHOTOGRAPHIC SHUTTER

[72] Inventor: Bruce K. Johnson, Andover, Mass.
[73] Assignee: Polaroid Corporation, Cambridge, Mass.
[22] Filed: June 29, 1970
[21] Appl. No.: 50,378

[52] U.S. Cl. .................................................95/59
[51] Int. Cl. ...........................................G03b 9/10
[58] Field of Search.....................................95/59

[56] References Cited

UNITED STATES PATENTS

| | | | |
|---|---|---|---|
| 1,966,313 | 7/1934 | Riddell | 95/59 |
| 3,460,454 | 8/1969 | Starp | 95/59 X |
| 2,249,517 | 7/1941 | Crumrine | 95/59 |
| 2,051,225 | 8/1936 | Riddell | 95/59 X |
| 3,381,598 | 5/1968 | Starp | 95/59 |

Primary Examiner—Samuel S. Matthews
Assistant Examiner—Monroe H. Hayes
Attorney—Brown and Mikulka, William D. Roberson and Gerald L. Smith

[57] ABSTRACT

An exposure mechanism which is formed having a singular spring loaded shutter blade. This blade has a rest position normally wholly blocking the passage of light through an associated aperture. An actuator assembly mounted co-pivotally with the shutter blade is operative to engage and displace the blade from its blocking rest position to a wholly unblocking spring loaded position. Following an appropriate interval of exposure, the actuator assembly releases the shutter blade for return movement to its blocking rest position to terminate an exposure.

29 Claims, 10 Drawing Figures

Patented May 2, 1972

INVENTOR.
BRUCE K. JOHNSON
BY Brown and Mikulka
and
Gerald L. Smith
ATTORNEYS

INVENTOR.
BRUCE K. JOHNSON
BY Brown and Mikulka
and
Gerald L. Smith
ATTORNEYS

INVENTOR.
BRUCE K. JOHNSON
BY Brown and Mikulka
and
Gerald L. Smith
ATTORNEYS

INVENTOR.
BRUCE K. JOHNSON

ATTORNEYS

INVENTOR.
BRUCE K. JOHNSON
ATTORNEYS

INVENTOR.
BRUCE K. JOHNSON

SELF-COCKING PHOTOGRAPHIC SHUTTER

The present invention is related to photographic exposure apparatus and more particularly, to a self-cocking photographic shutter useful in conjunction with flash photography.

BACKGROUND

Popularly priced cameras developed for specialized uses, for instance portraiture, require exposure systems meeting specialized performance as well as production criteria. Where intended for informal portrait photography, the cameras should incorporate optical systems of relatively long focal length in order to overcome a perspective distortion of the image of a subject. The degree of this extension of focal length generally represents a consolidation or compromise of several photographic factors. For instance, to achieve a desirable framing of the subject of a portrait upon a given film format, camera-to-subject distance must increase with increasing focal length. As this subject distance is lengthened, however, the provision of adequate subject lighting becomes a more predominant design consideration.

To maintain a design simplicity required for popularly priced cameras suitable for high volume production, a conventional camera mounted flash lamp light source must be utilized. Such light sources have somewhat fixed output characteristics and limited range. Consequently, the exposure systems of the camera must be capable of utilizing as much of the light available from the flash lamps as is possible in order to permit the optical system of the camera to perform at a desired subject distance. This exposure capability only can be achieved through the use of an exposure apparatus providing a highly efficient shutter operation. Shutter efficiency is realized in configurations which function to entirely unblock and subsequently block an exposure aperture at very high speeds. Between such high speed blocking and unblocking of the aperture, the shutters establish an exposure interval. Efficient shutter mechanisms retain a capability for passing a maximum amount of the total shutter regulated illumination witnessed at a film plane during this exposure interval.

In scaling an optical system of a given f/number to achieve a longer focal length, lens size or actual aperture width will be caused to increase in order to maintain light gathering ability. In view of the limitations and available light occasioned with the flash lamp sources now discussed, designs for portrait cameras will tend to call for relatively larger lens sizes. Shutter efficiencies are more difficult to achieve with such larger lens elements because the light blocking elements of a shutter must be caused to move over longer distances during their blocking and unblocking movements.

To make optimum use of light available from a flash lamp source, an exposure mechanism, however inexpensive, must retain its efficiency while providing an accurate control of shutter interval. Design considerations for providing cameras fabricable at high volume and low unit cost further require an exposure mechanism formed of a minimum number of parts, which is simply assembled, self-cocking and which retains its spring or drive members in a substantially unloaded status between exposure cycles. Further, to achieve a simplified design, the accuracy of the exposure mechanism should be achieved using reasonable spring forces.

SUMMARY

The present invention is addressed to an exposure mechanism exhibiting significantly improved efficiencies and accuracy under the criteria imposed by the exposure parameters of flash illuminated informal portrait photography. The shutter mechanism of the invention retains a high degree of accuracy while operating at speeds suited for making maximum utilization of the light available from a flash lamp source.

Further characterized in an immunity from variation in shutter release pressures, the shutter arrangement of the exposure mechanism is formed incorporating a singular spring loaded shutter blade having a rest position normally wholly blocking the passage of light through an associated aperture. An actuator assembly mounted co-pivotally with the singular shutter blade is configured to displace the blade from its blocking rest position to a wholly unblocking spring loaded position through a mechanical activity not associated with manually responsive elements of the shutter. As a result, the apparatus of the invention enjoys an immunity from the dynamic force variations otherwise occasioned in manually actuated shutter systems.

The shutter arrangement of the invention is self-cocking, utilizing spring loaded elements. All springs within the mechanism are cooperatively loaded during a shutter actuation such that no one spring is tensioned or operated "against" another. The latter feature permits the mechanism to exhibit desirably lower shutter release pressures. Further in this regard, all spring assemblies within the exposure control mechanism are arranged to assume a rest status following their actuation to cause exposure. The latter feature eliminates any possible long term distortion which may be occasioned by springs loaded against plastic parts or the like, common in low cost, high volume photographic exposure mechanisms.

A further feature and object of the invention is to provide a control mechanism for photographic cameras which exhibits consistent, efficient and accurate performance characteristics even though operated in a range of shutter speeds suited to flash illuminated portraiture photography, for instance in the range of one-fiftieth of a second.

As an additional feature and object of the invention, the instant shutter mechanism is immune from abortively reacting to inadvertent partial manual depression of a shutter release member. A substantially full depression of such a release member is required by a camera operator before the shutter mechanism will cause the unblocking of an exposure aperture.

Another object of the invention is to provide a highly efficient and accurate shutter mechanism for flash portraiture photography which is fabricable at high volume and low unit cost. In achieving this object, the shutter mechanism provides for the co-pivotal mounting of significant numbers of its component parts. Further, the mechanism of the invention is fully fabricable with only a minimal number of components.

Other objects of the invention will in part be obvious and will in part appear hereinafter.

The invention accordingly comprises the apparatus and mechanism possessing the construction, combination of elements and arrangement of parts which are exemplified in the following detailed disclosure.

DETAILED DESCRIPTION

In its preferred embodiment, the exposure mechanism of the present invention utilizes a singular shutter blade having a rest position wholly blocking the passage of light through an exposure aperture. An exposure interval is created by mechanically pivoting the singular blade away from its blocking position to a position wholly unblocking the exposure aperture so as to initiate an exposure interval. The exposure interval is terminated by releasing the now spring loaded shutter blade and permitting it to return to its initial or rest position. Because the mechanical activity of engaging and drawing the shutter blade away from its rest position and releasing the blade to define an exposure interval is carried out by mechanical elements fully isolated from a shutter release lever, the exposure apparatus is fully immune from variations in manual pressures applied to a release mechanism during an exposure cycle.

In the discussion to follow, the terms "clockwise" and "counterclockwise" are used in a descriptive sense for the purpose of facilitating an understanding of the operation of the mechanism as viewed within the referenced drawings. These terms are not used in limitation of the disclosure.

Figure 1:
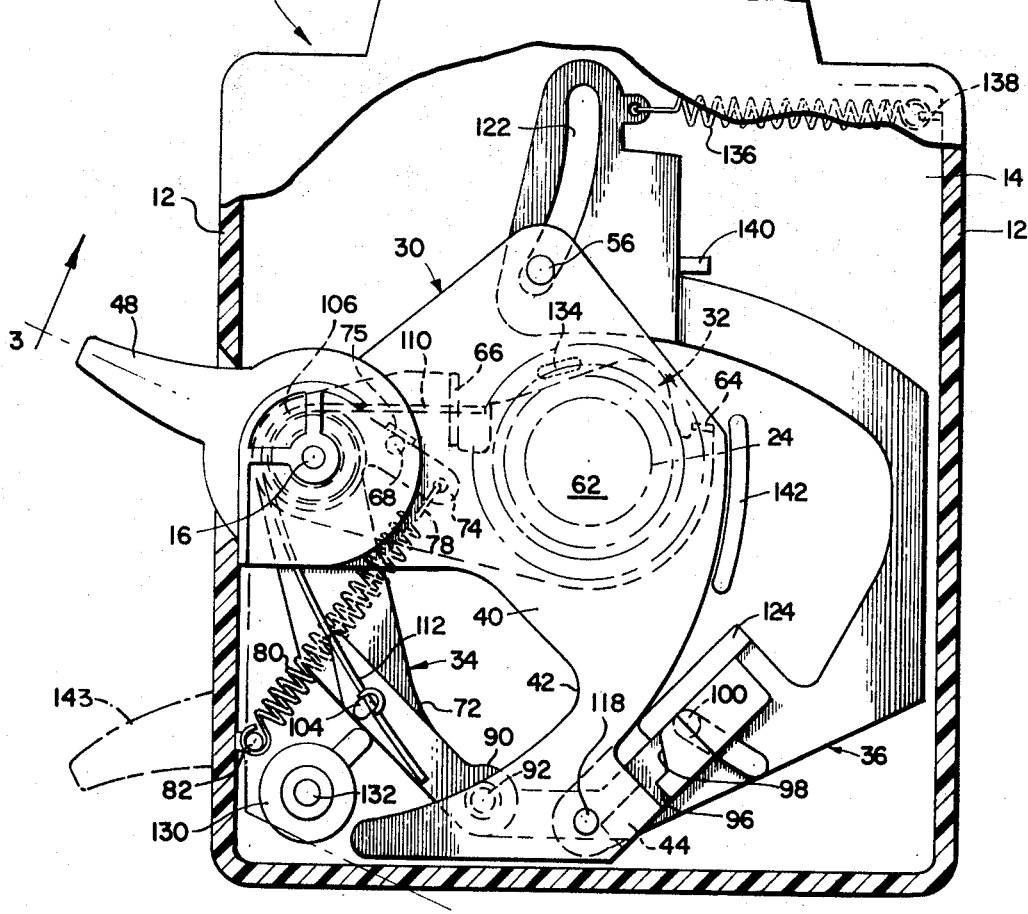
FIG. 1 is a front sectional view of an exposure mechanism housing of a photographic camera revealing a shutter mechanism according to the invention in a preexposure or rest orientation.
Figure 3:
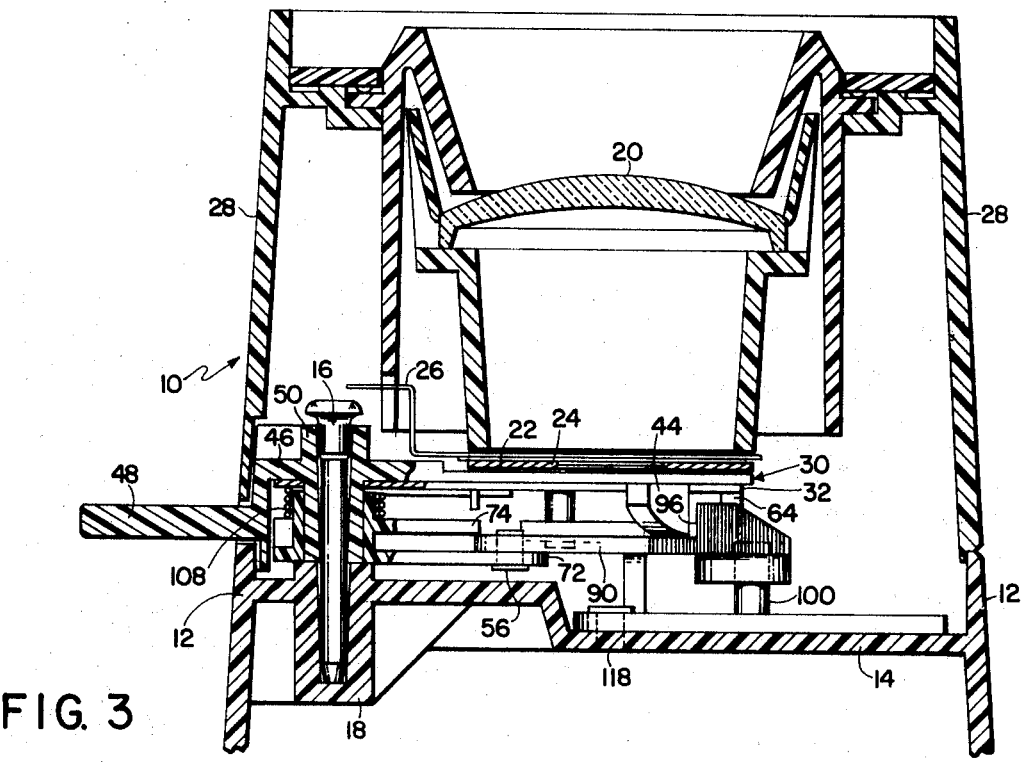
FIG. 3 is a sectional view of shutter mechanism of FIG. 1 taken through the line 3—3 of FIG. 1.
Figure 4:
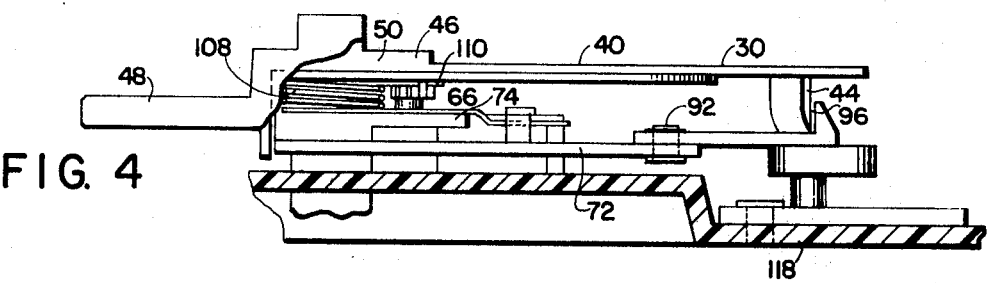
FIG. 4 is a fragmentary top view of portions of the shutter mechanism of FIG. 1.

Referring to FIG. 1, a forward portion of the housing of a portrait camera is shown generally at 10. Housing 10 is formed having peripheral side walls 12 which, in turn, support an integrally molded base plate 14. All of the major elements of the exposure apparatus are pivotally mounted or journaled over a stud 16 which is affixed by staking or the like into a support structure 18 of base plate 14. As seen in FIG. 3, the exposure mechanism components function to regulate the passage of light along an optical path including a lens 20 and a diaphragm 22 which serve to establish an aperture opening 24. Mechanical elements for providing a one to two stop trim of the aperture opening 24 are depicted in part at 26. The diaphragm 22 and lens 20 assembly are supported by a forward housing portion 28 which is semi-permanently fixed to peripheral side wall 12 of the camera.

Figure 2:
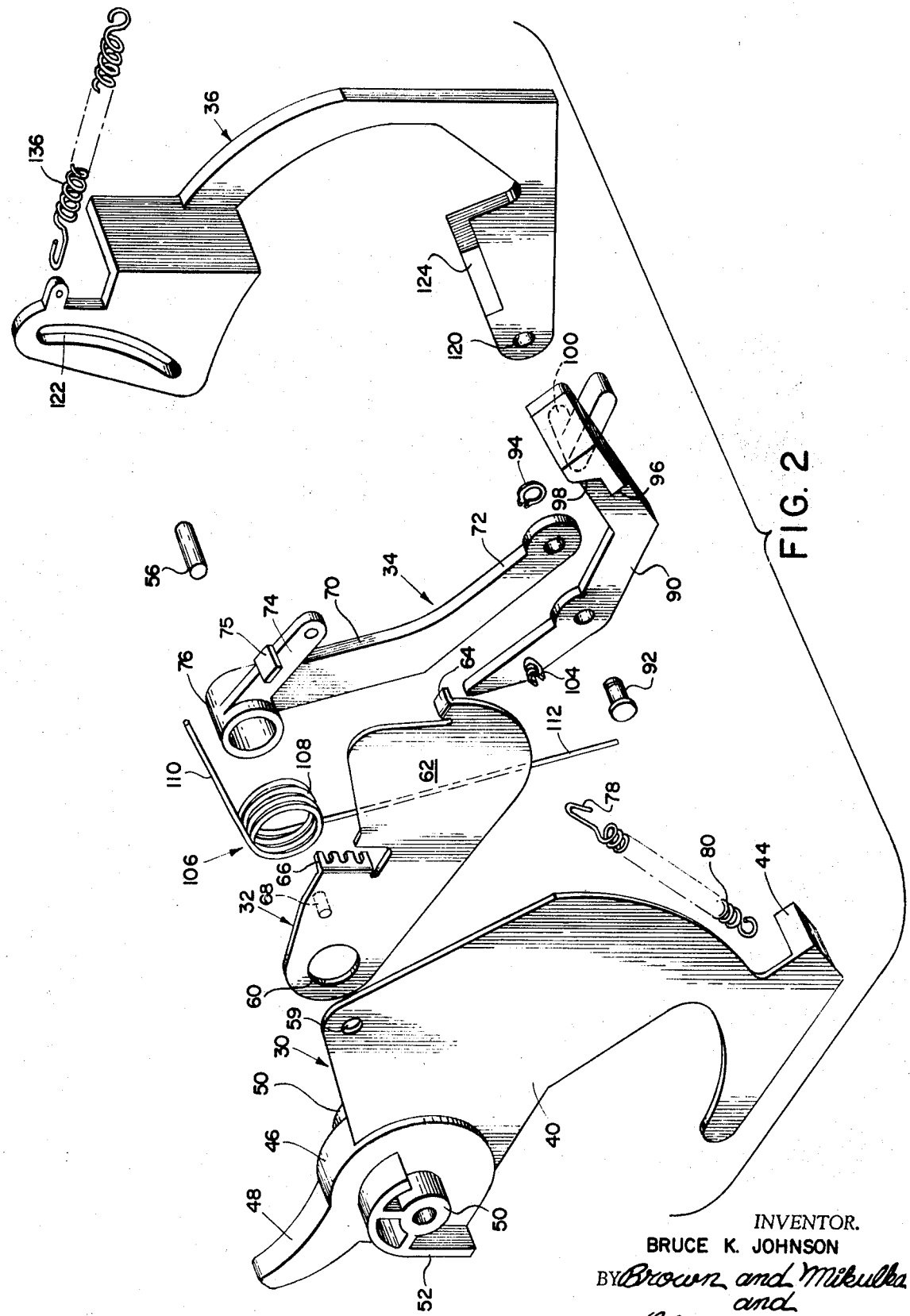
FIG. 2 is a perspective, exploded view of certain elements of the shutter mechanism of FIG. 1.

Returning to FIGS. 1 and 2, the shutter elements of the exposure apparatus of the invention are shown to generally comprise a loading arm or member 30, a shutter blade 32 and an articulated shutter actuator assembly 34. A fourth arm member, shown generally at 36, cooperates within the shutter assembly to provide a camming function which is described later herein.

Loading arm assembly 30 may be formed as a unitary, molded element having a thin blade portion 40 which will be seen to function as a leak plate or capping blade. Blade portion 40 is configured having a notched area 42 which extends toward a lowermost engaging tab 44 depending inwardly toward base plate 14. Blade portion 40 is formed of a material opaque to light such as plastic or the like and may be integrally molded with a cylindrically shaped supporting portion 46 of a shutter release lever 48. Supporting portion 46 is configured having a cylindrical shaped central bearing shaft 50 which is journaled over stud 16 and an outer, ribbed buttressing portion 52. The uppermost tip of blade portion 40 of the loading arm 30 is formed having an annular opening 54 within which is secured one end of a camming pin 56.

Shutter blade 32 is pivotally mounted immediately behind loading arm 30. Blade 32 is formed of a material opaque to light and, for purposes concerned with the dynamics of the exposure assembly, this material is preferably a metal or similar substance which is relatively heavy. Blade 32 is formed having an annular opening 60 which is journaled over and rotatable about the central bearing shaft 50 of loading arm 30. The blade 32 is designed having a planar aperture blocking portion 62 and an inwardly extending tab 64. Inwardly disposed from the blocking portion 62 is a vertically oriented flange 66 having detents formed therein for receiving one end of a shutter drive spring. Flange arrangement 66 is commonly referred to in the art as a "comb", the detents therein permitting facile adjustment of the tensioning of a shutter spring. A stud 68 extends rearwardly from the blade.

Articulated shutter actuator assembly 34 is mounted on the inward side of shutter blade 32 and is configured having a dual component drive arm 70, one side of which is shown at 72 spaced from a spring powered side 74 having a tab 75. Sides 72 and 74 are molded integrally with a cylindrical support bearing 76, the central opening within which is slideably journaled for rotation about central bearing shaft 50 of loading arm 30. Drive arm 70 is biased for rotation in a clockwise or downward direction by virtue of the connection of the tip of its spring powered side 74 with one end 78 of a helical spring 80. The opposite end of spring 80 is attached to a stud 82 extending from base plate 14.

The articulated side 72 of drive arm 70 is configured to pivotally support a shutter latching member 90. Pivotal connection of the member 90 to side 72 of drive arm 70 is provided by a journaled connection of each element to a pin 92 extending therethrough. Pin 92 is retained in position by a lock ring 94.

One side of latching member 90 is formed as an outwardly extending engaging surface 96 adapted to contact engaging tab 44 of loading arm 30 in a rotationally driven relationship. The tip of member 90 is further configured having a shutter engaging latch surface 98 which, at an appropriate time during an exposure cycle, is operative to contact and engage with tab 64 of shutter blade 32. Disposed opposite surfaces 98 and 96 and on an inward side of latching member 90 is a cylindrically shaped camming element 100 the function of which is to provide positional control over a shutter latching member 90 during movement of assembly 34. The latching structure of member 90, including surfaces 96 and 98 as well as camming element 100, is configured such that these surfaces may be molded integrally with member 90. The opposite side of member 90 is configured to support a small bracket 104. Bracket 104 serves to engage a spring assembly which asserts a rotational bias upon latching member 90.

Positioned intermediate shutter blade 32 and articulated shutter actuator assembly 34 is a shutter blade return spring shown generally at 106. Spring 106 has a centrally disposed spirally wound portion 108 which is dimensioned and configured to slideably fit over central bearing shaft 50. One end, 110, of spring 106 is engageable within a detent in comb 66 and the opposite end, 112, of the spring is arranged within the apparatus to engage within bracket 104 of latching member 90.

As evidenced from FIGS. 1 through 4, shutter blade 32, spring 106 and articulated shutter actuator assembly 34 may be simply assembled as a sub-unit upon the central bearing shaft 50 of loading arm 30 during the fabrication of the exposure apparatus. Further, it will become apparent that, during assembly, all spring members within the structure are essentially at a rest or non-loaded orientation. Such structural arrangement of the components of the apparatus considerably facilitates its production using high volume, low unit cost techniques.

Arm member 36 is mounted for pivotal movement about base plate 14 by a connection including a pin 118 extending through a hole 120 in the lowermost portion of the base. The point of connection of the pin 118 with the base is displaced from and lower than the connection of pin 16 with the base. Arm 36 assumes a generally U-shaped configuration extending about the operational periphery of shutter blade 32 and the shutter actuator assembly 34. Arm 36 terminates in an upwardly extending and curved camming slot 122. Camming slot 122 is configured to receive camming pin 56 which, in turn, is fixed to loading arm 30 at 54. Extending outwardly from the lower portion of arm 36 is a camming flange 124. Flange 124 will be seen to assure the physical isolation of latching member 90 from other components of the apparatus during an exposure producing cycle of operation.

Referring particularly to FIG. 1, the elements of the exposure apparatus are illustrated as assembled and in a pre-exposure or rest orientation. In the rest position depicted, a minor tensioning of helical spring 80 biases side 74 of articulated shutter assembly 34 in a downward or clockwise orientation. Travel of the assembly 34 in a clockwise direction is limited by its contact with the tip of a stop member 130. Stop member 130 is mounted upon base plate 14 by a pin structure 132 extending therethrough. The position of contact of stop member 130 with shutter actuator assembly 34 may be adjusted by rotation of the member 130 in either direction. Contact between member 130 and shutter actuator assembly 34 is mainly effected through one side of latching member 90. Such contact will urge the member 90 into clockwise rotational movement. The degree of such movement is limited by virtue of the downwardly directed and relatively mild bias exerted by side 112 of spring 106.

As described earlier, side 110 of spring 106 is connected to flange 66 of shutter blade 32. Inasmuch as the travel of side 112 of the spring is limited by virtue of its connection with shutter actuator assembly 34 and since the spring is slideably movable about central bearing shaft 50, a slight upward bias is exerted by side 110 upon shutter blade 32. Movement of the blade 32 is limited by a boss 134 formed integrally with and extending from base plate 14. Note that in the rest or pre-exposure orientation illustrated in FIG. 1, shutter blade 32 is in a position wholly blocking passage of light through aperture opening 24, this position being established by virtue of the contact of its upper edge with boss 134.

Clockwise rotational bias is exerted upon loading arm 30 as a result of its interconnection through pin 56 camming slot 122 with arm member 36. A slight preexposure bias is exerted upon arm member 36 by a helical spring 136, one end of which is attached to base plate 14 at 138. Rotational movement of arm member 36 under the bias of spring 136 is limited by its abutment against a boss 140 extending from base plate 14. Base plate 14 also supports a mildly curved camming flange 142. Camming flange 142 may be integrally molded within the base plate 14 and is spaced slightly outwardly from the outer rotational periphery of loading arm 30. An optional feature of the exposure apparatus is a stationary supporting trigger 143 which may be used to assure a more steady control of the camera during depression of shutter release lever 48. Stationary trigger 143 is positioned upon the apparatus slightly forward of the shutter release lever 48.

OPERATION

As discussed earlier, FIG. 1 illustrates the orientation of the elements of the exposure mechanism in a pre-exposure status. When assuming this status, the components of this mechanism are lightly loaded, the springs supplying this load being only slightly tensioned. In the orientation FIG. 1, both shutter blade 32 as well as the aperture blocking portion 40 of loading arm 30 serve to cover aperture opening 24. In this orientation as well as others during an exposure cycle, loading arm 30 provides a secondary function as "capping blade" assuring no light leakage through aperture opening 24 as may be occasioned by spurious impact or the like.

Figure 5:
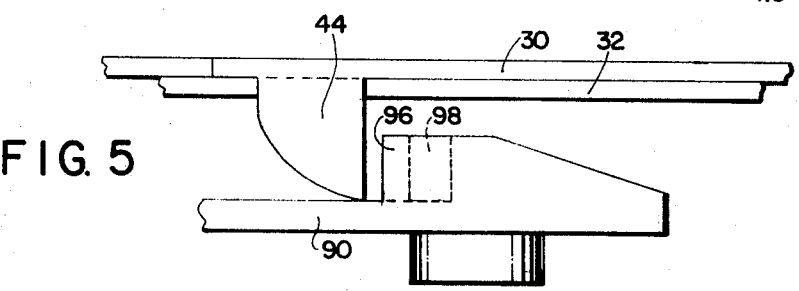
FIG. 5 is a fragmentary side view of a portion of the shutter mechanism of FIG. 1; showing the interconnection of portions of an actuator assembly latch and a capping blade.

The components of the exposure apparatus are depicted in various orientations which they assume during an exposure cycle in FIGS. 1 and 6 through 10. With the initial depression of shutter release lever 48, loading arm 30 will be caused to commence to rotate in a counterclockwise direction. This counterclockwise movement is resisted to a controlled degree by a gradual tensioning of helical spring 136, the force from which is transmitted to loading arm 30 through its connection with arm member 36. As loading arm 30 rotates, its engaging tab 44 will commence to move upwardly and into contact with engaging surface 96 of latching member 90. The orientation of engaging tab 44 and surface 96 prior to this contact is illustrated in detail in FIG. 5. Once contact between tab 44 and surface 96 is effected, shutter actuator assembly 34 will be caused to rotate in a counterclockwise direction. The position of shutter latching member 90, however, is maintained outwardly of the periphery of shutter blade 32. Control over the movement of latching member 90 is provided by virtue of the sliding contact of its camming element 100 first with camming flange 124 and later with camming flange 142. Transfer of camming element 100 from camming flange 124 onto camming flange 142 is effected by virtue of the rotation imparted to arm member 36 coincidently with the depression of shutter release lever 48. As arm member 36 is rotated, camming flange 124 will align with flange 142 to permit transfer of camming element 100 therebetween.

Figure 6:
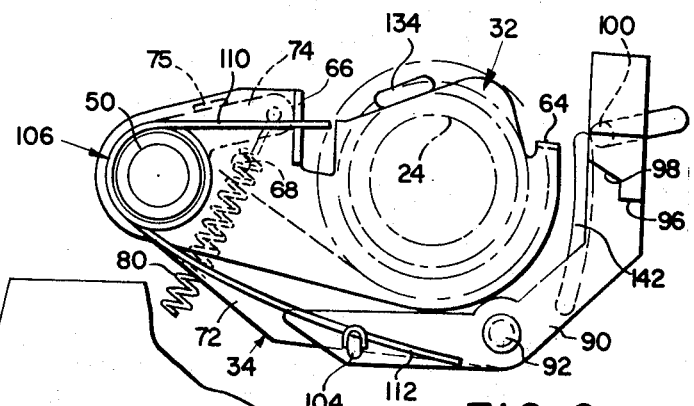
FIG. 6 is a fragmentary view of the shutter mechanism of FIG. 1 showing an intermediate orientation of its shutter blade actuator.

Loading arm 30 continues to cause the rotation of articulated shutter actuator assembly 30 through its engagement of tab 44 with surface 96 until camming element 100 reaches the upper extremity of camming flange 142. Referring to FIG. 6, the components of the apparatus are illustrated at this point in time during an exposure cycle. Note in the latter figure that spring 106 has been tensioned as a result of the rotation of shutter actuator assembly 34 through its connection with side 112 of the spring at bracket 104. Spring loading of actuator assembly 34 through bracket 104 also serves to impart a counterclockwise rotational bias to shutter latching member 90. This bias assures proper camming contact between camming element 100 with camming flange 142. Note further that helical spring 80, attached to side 74 of shutter actuator assembly 34, has been tensioned to impart an operational bias to the assembly 34. During the foregoing operation, all essential springs within the system are simultaneously loaded and no one spring is tensioned against another. As is illustrated in FIG. 6, latching member 90 of shutter actuator assembly 34 is moved in isolation from shutter blade 32 by virtue of its association with camming flanges 124 and 142.

Figure 7:
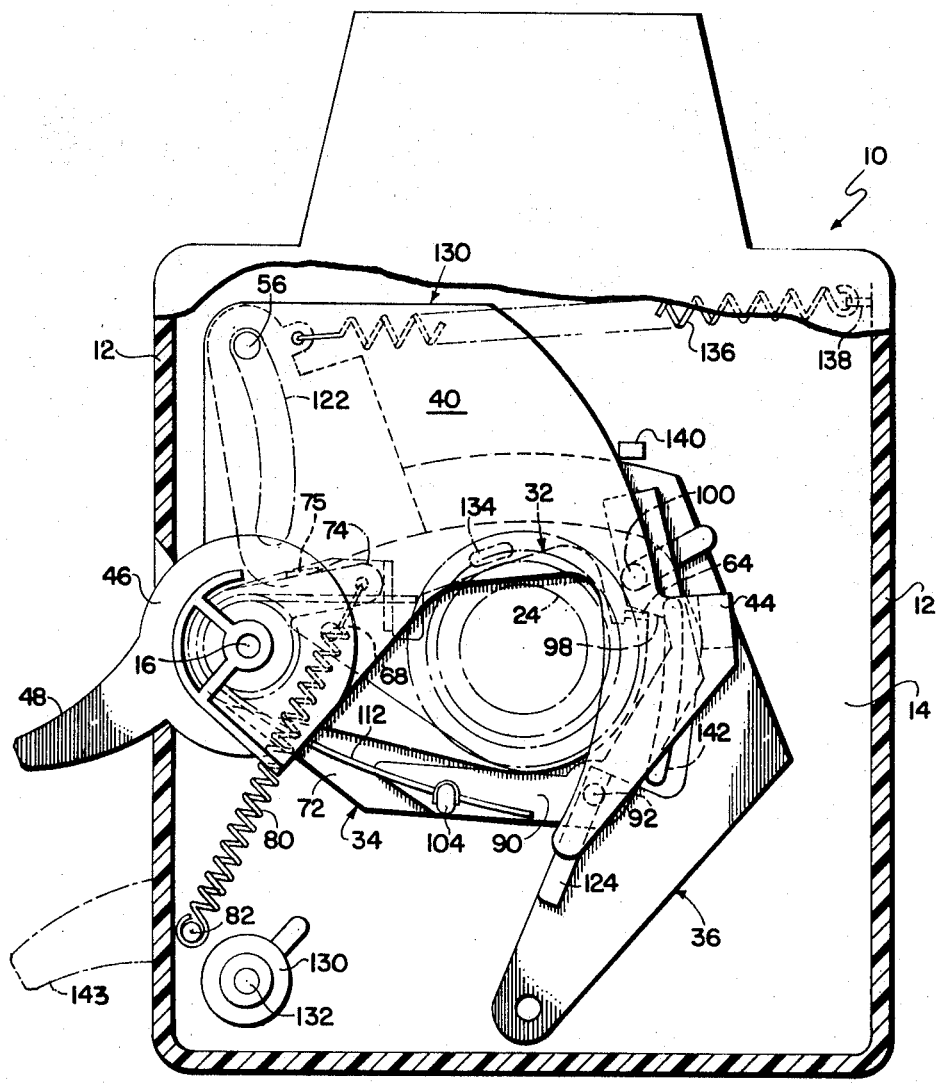
FIG. 7 is a front sectional view of the shutter mechanism of FIG. 1, showing an orientation of its components during an exposure cycle.

Turning to FIG. 7, the orientation of the exposure apparatus is depicted at a point in time when shutter actuator lever 48 has been substantially fully depressed, springs 80, 106 and 136 have reached their peak loading, and camming element 100 has been advanced out of contact with camming flange 142. The latter disconnection of camming element 100 permits latching member 90 to pivot about pin 92 under the bias of spring 106 until its engaging surface 98 contacts tab 64 depending from the periphery of shutter blade 32. It may be further noted that the loading arm aperture blocking portion 40 has passed over aperture opening 24 so as to permit shutter blade 32 to fully unblock opening 24 at an appropriate time during the exposure cycle. At this juncture in the cycle, all mechanical contact with the hand actuated loading arm 30 by associated components of the shutter assembly is withdrawn. As a result, the exposure producing operation of the shutter is immune from variations in actuation pressures or speeds imposed upon shutter release lever 48.

Figure 8:
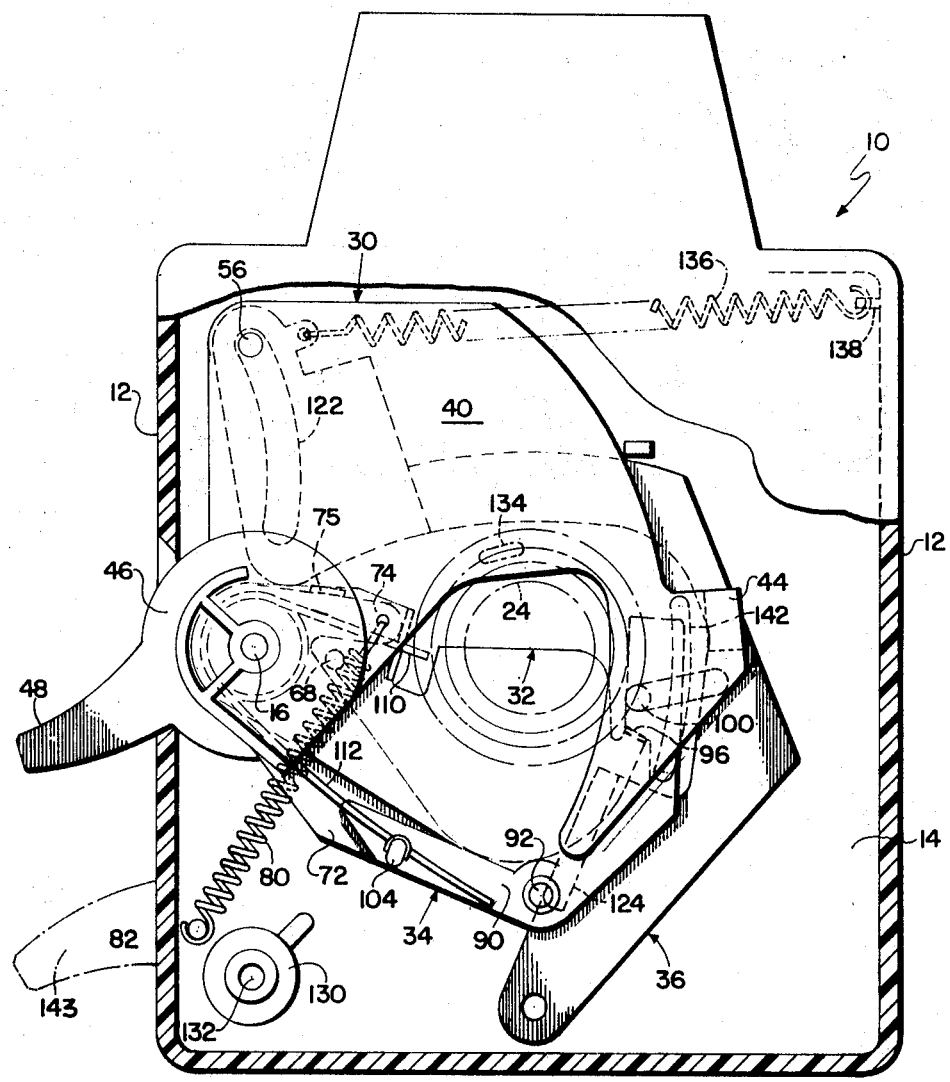
FIG. 8 is a front sectional view of the shutter mechanism of FIG. 1 showing the orientation of its elements during the initiation of an exposure interval.
Figure 9:
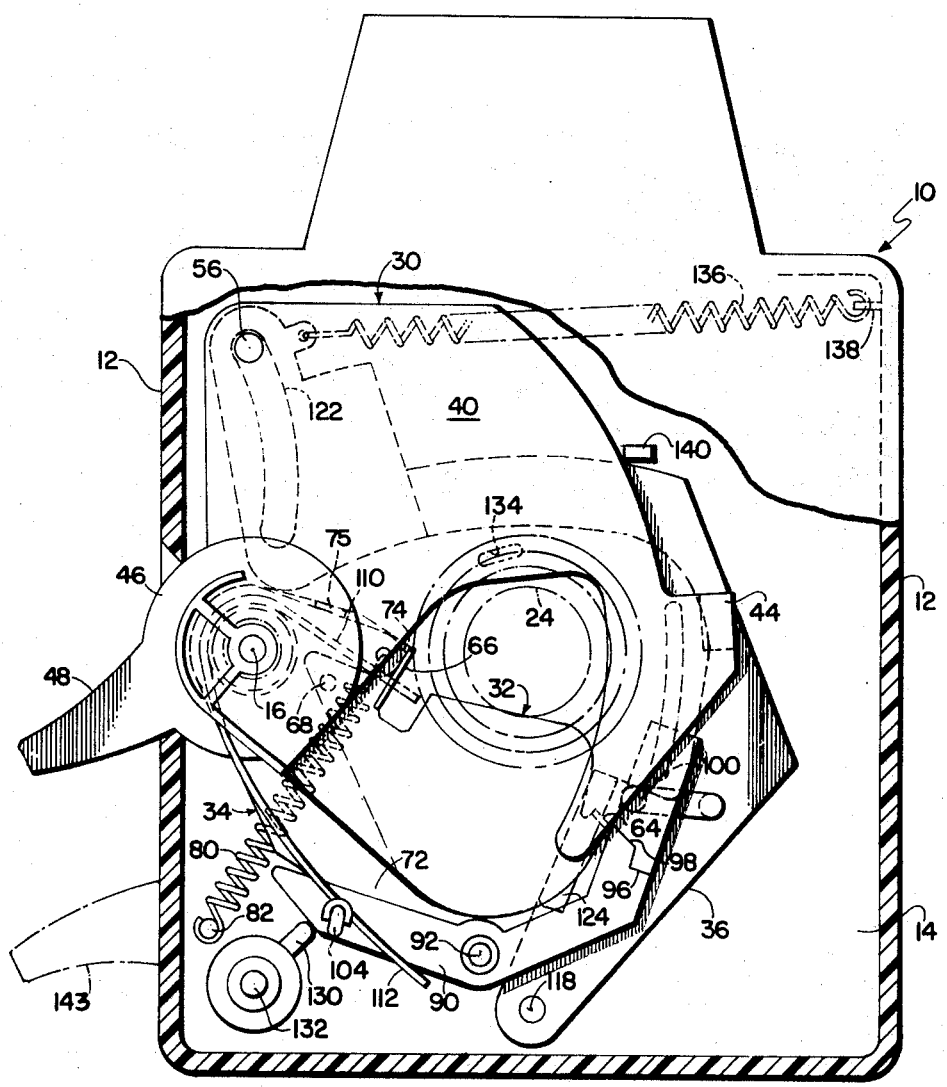
FIG. 9 is a front sectional view of the shutter mechanism of FIG. 8 showing the orientation of its elements during the termination of an exposure sequence.

When latch surface 98 has fully engaged tab 64 of shutter blade 32, side 72 of shutter actuator assembly 34 serves as a power arm driven by now loaded spring 80. Assembly 34 is now operative to pivot shutter blade 32 into a wholly open orientation. The orientation of the components of the mechanism at a half open shutter blade position during this movement is illustrated in FIG. 8. The latter figure additionally reveals the orientation of camming element 100 with respect to flanges 142 and 124 during this movement. Note that the element 100 is positioned inwardly of camming flanges 124 and 142. Another feature of the operation of the apparatus resides in the loaded status of spring 106 during shutter opening movement. Spring 106 remains substantially fully tensioned during the movement of blade 32 from a blocking to an unblocking position.

The above-discussed opening rotation of shutter blade 32 and shutter actuator assembly 34 continues until shutter blade 32 has passed the aperture opening 24 and shutter latching member 90 moves into contact with stop member 130. With the latter contact, latching member 90 is caused to rotate in a clockwise direction to cause the disengagement of latch surface 98 from tab 64. The position of this shutter blade release is adjustable by varying the orientation of stop member 130. To extend the exposure interval defined by the motion of shutter blade 32, the latched or coupled combination of shutter actuator assembly 34 and shutter blade 32 may be permitted to pivot a predetermined distance beyond aperture opening 24. Such incremental movement extends the shutter interval while not effecting the high shutter efficiency present in the apparatus. For instance, such additional incremental travel of the assembly will have no significant effect on the travel time required for the shutter blade 32 to cross and fully unblock and subsequently to cross and fully block aperture opening 24. Following release of shutter blade 32, shutter actuator assembly 34 will resume its pre-exposure position, its camming element 100 returning beneath and to the outward camming edge of camming flange 124.

Figure 10:
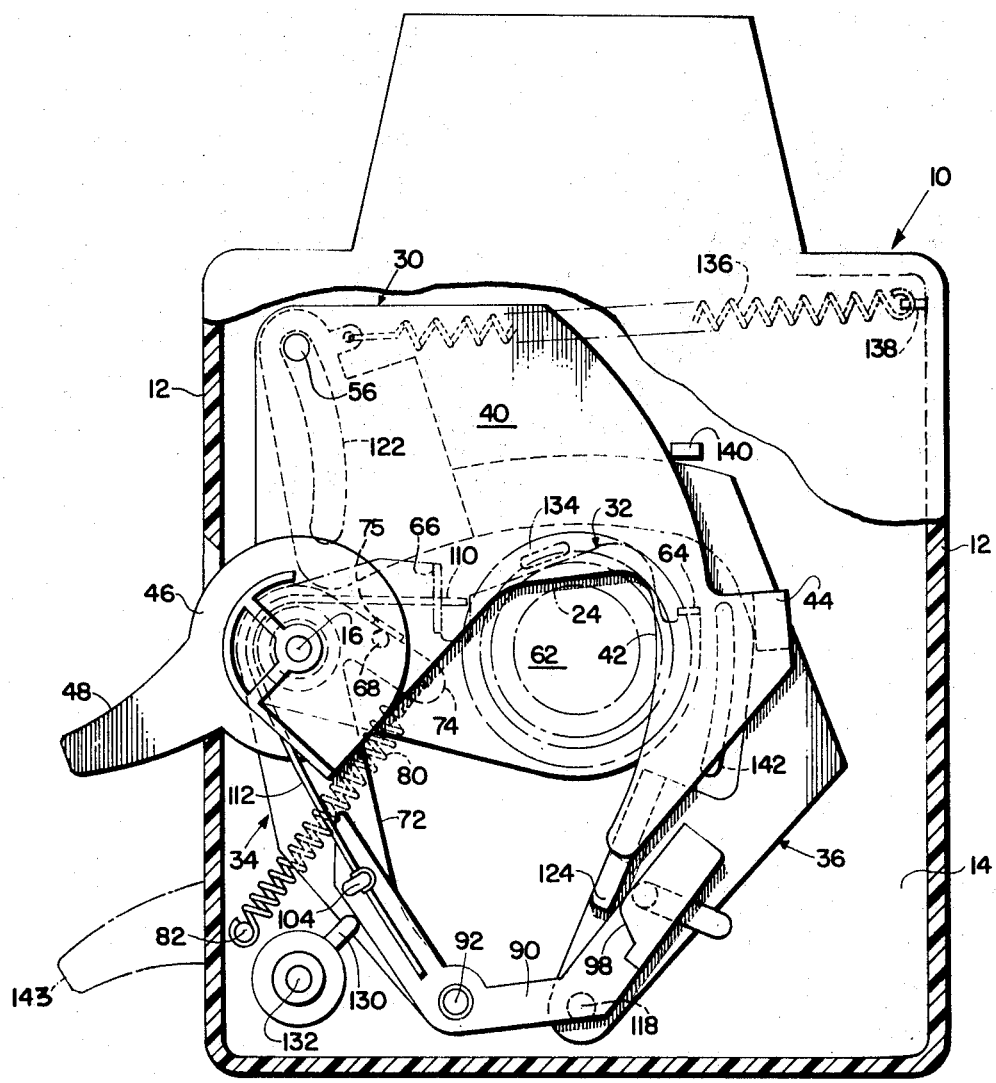
FIG. 10 is a front sectional view of the shutter mechanism of FIG. 9 showing the orientation of its elements as they are oriented in a later stage of the termination of an exposure sequence.

Referring to FIG. 10, the exposure apparatus is illustrated in an orientation assumed when latching member 90 has released shutter blade 32 as a result of striking stop 130 and the shutter blade 32 has pivoted under the bias of spring 106 toward boss 134. As shutter blade 32 reaches its rest or blocking position, stud 68 extending inwardly therefrom will come into contact with tab 75 extending outwardly from arm 74 of the actuator assembly 34. Assembly 34 will rotate very slightly and provide an ideal damping in arresting the upward motion of shutter blade 32. The slight amount of travel is indicated in the figure by the very short distance between the upper edge of shutter blade 32 and boss 134. During the motion damping action, the aperture opening 24 is wholly blocked.

Note that this movement of shutter blade 32 also takes place in complete isolation from any spurious dynamic influence occasioned by manually exerted pressure upon shutter release lever 48. The above discussed movements of the shutter actuator assembly 34 and shutter blade 32 take place during the depression of shutter release lever 48. Following the exposure producing operation described above, lever 48 is released to permit loading arm 30 to pivot under the loading of spring 136 into the rest orientation described earlier in connection with FIG. 1. As loading arm 30 resumes its initial orientation, its blade portion 40 provides additional covering of aperture opening 24, thereby serving the "capping blade" function discussed earlier.

As advantageous feature of the operation of the apparatus resides in the inability of the mechanism to cause an exposure until shutter release lever 48 is fully depressed. The foregoing discussion revealed that latching member 90 was cammed outwardly from camming flanges 124 and 142 until actuator assembly 34 was rotated to its substantially maximum upward orientation. Failure to fully depress the lever 48 or subsequent release of the lever from a partially depressed position merely causes member 90 to cam rearwardly to its pre-exposure or rest position. This feature prevents an aborted exposure resulting from inadvertent partial depressions of lever 48.

As earlier noted, a relatively heavy or dense material, such as steel, may be used for fabricating shutter blade 32. When so fabricated, the blade 32 exhibits an inertia which may be utilized for efficiently deriving the relatively slower exposure intervals desired with flash illuminated portraiture photography. The characteristically high efficiency of the shutter mechanism is retained, however, where higher speeds, i.e. shorter exposure intervals are required. For the latter form of operation, the shutter blade 32 preferably is formed of a lighter material such as a plastic or the like.

Since certain changes may be made in the above apparatus without departing from the scope of the invention herein involved, it is intended that all matter contained in the above description or shown in accompanying drawings shall be interpreted as illustrative and not in a limiting sense.

What is claimed is:

1. An exposure control mechanism for photographic apparatus comprising:
    means defining an exposure aperture;
    shutter blade means movable between a rest position normally wholly blocking the passage of light through said aperture and an open position permitting the passage of light through said aperture;
    resilient means for urging said shutter blade into said rest position and movable therewith when in a loaded state from said rest position toward said open position; and
    actuator means for loading said resilient means and for engaging said shutter blade means at said rest position for moving said shutter blade means and said resilient means from said rest position to said open position to initiate an exposure through said aperture and for releasing said shutter blade means when at said open position to permit its return to said rest position under the bias of said resilient means to terminate said exposure.

2. The exposure control mechanism of claim 1 further comprising loading means engageable with said actuator means for causing said actuator means to move into said shutter blade means engagement.

3. The exposure control mechanism of claim 2 in which said loading means is configured incorporating a capping surface for preventing the passage of light through said aperture when said shutter blade means is in said rest position and said actuator means is in said initial position.

4. The exposure control mechanism of claim 2 in which said loading means includes manually actuated shutter release means for causing said loading means movement.

5. The exposure control mechanism of claim 1 in which said shutter blade means, said actuator means and said resilient means are mounted for rotational movement about a common axis.

6. The exposure control mechanism of claim 5 in which said loading means is mounted for rotational movement about said common axis.

7. The exposure control mechanism of claim 1 in which said actuator means includes latch means movable therewith for effecting said shutter blade means engagement and for effecting said shutter blade means release when in said open position.

8. The exposure control mechanism of claim 7 wherein said latch means is resiliently biased for effecting said shutter blade means engagement.

9. The exposure control mechanism of claim 7 in which said actuator means further includes contact means engageable with said latch means when said shutter blade means is in said open position for causing said latch means to release said shutter blade means, thereby terminating an exposure through said aperture.

10. The exposure control mechanism of claim 7 in which said actuator means includes spring means for biasing said actuator means to move with said shutter blade means.

11. An exposure control mechanism for photographic apparatus comprising:
    means defining an exposure aperture;
    a shutter blade mounted for rotational movement about a given pivot axis between a rest position normally blocking said exposure aperture and an open position unblocking said exposure aperture;
    resilient means for biasing said shutter blade to move towards said rest position;
    actuator means movable between initial and terminal positions and including latch means for selectively engaging said shutter blade, power arm means mounted for rotational movement about said given pivot axis for selectively moving said latch means into engagement with said shutter blade, and spring means for biasing said power arm means and said latch means for movement toward said initial position, said latch means being engageable with said shutter blade when said actuator means is in said terminal position and when said blade is in said rest position for moving said shutter blade from said rest position toward said open position under said spring means bias to initiate an exposure, and said latch means being operative to release said shutter blade when at said open position to permit said resilient means to return said shutter blade to said rest position and thereby terminate an exposure; and loading means for engaging said actuator means when at said initial position, moving said actuator means into said terminal position and releasing from said engagement when said actuator means is in said terminal position.

12. The exposure control mechanism of claim 11 in which said latch means is resiliently biased for causing said shutter blade engagement at said rest position.

13. The exposure control mechanism of claim 11 in which said latch means includes contact means engageable therewith when said actuator means is moved into said initial position for causing the release of said shutter blade from said open position.

14. The exposure control mechanism of claim 13 in which said resilient means is configured and arranged to assert said latch means bias.

15. The exposure control mechanism of claim 14 in which said power arm means and said loading means are mounted co-pivotally with said shutter blade for rotational movement about said given pivot axis.

16. An exposure control mechanism for photographic apparatus comprising:
means defining an exposure aperture;
a shutter blade mounted for rotational movement about a given pivot axis between a rest position normally blocking said exposure aperture and an open position unblocking said exposure aperture;
an articulated actuator assembly movable between initial and terminal positions and including an arm portion mounted for movement about said given pivot axis and a latch assembly pivotally mounted upon and movable with said arm portion, said latch assembly being engageable with said shutter blade when said actuator assembly is in said terminal position;
a spring assembly having one side coupled with said shutter blade and another side coupled with said actuator assembly, said spring assembly being configured for loading when said actuator assembly is moved into said terminal position;
resilient means for biasing said actuator assembly to move from said terminal position to said initial position; and
a loading element mounted for movement about said given pivot axis, engageable with said actuator assembly to cause its movement from said initial to said terminal position, and movable out of said engagement when said actuator assembly is in said terminal position.

17. The exposure control mechanism of claim 16 including a contact member engageable with said latch assembly when said actuator assembly is in said initial position and operative to cause said latch assembly to release from said shutter blade engagement so as to terminate an exposure through said aperture.

18. The exposure control mechanism of claim 17 in which said shutter blade is configured incorporating a flange portion contactable in camming relationship with said latch assembly when said actuator assembly is moved from said initial to said terminal position.

19. The exposure control mechanism of claim 17 in which said spring assembly other side is configured and arranged for biasing said latch assembly into said shutter blade engagement.

20. The exposure control mechanism of claim 17 in which said loading element is formed as a capping blade operative to block said aperture when said actuator assembly is in said initial position and said shutter blade is in said rest position.

21. An exposure control mechanism for photographic apparatus comprising:
means defining an exposure aperture;
shutter blade means movable about a given axis between a rest position normally wholly blocking the passage of light through said aperture and an open position permitting the passage of light through said aperture;
resilient means for urging said shutter means into said rest position and being loadable into an energy storing orientation; and
actuator means movable about said axis between initial and terminal positions for loading said resilient means when moved from said initial to said terminal position, engageable with said shutter blade means when in said terminal position for moving said shutter blade means to said open position to initiate an exposure through said exposure aperture, operative when in said initial position to disengage from said shutter blade means and to release said resilient means from said energy storing orientation for causing said resilient means to move said shutter blade means into said rest position so as to terminate said exposure.

22. The exposure control mechanism of claim 21 wherein said resilient means comprises at least one spring member rotatable about said given axis.

23. The exposure control mechanism of claim 22 wherein said spring member is formed having one side coupled in driving relationship with said shutter blade means and another side coupled with said actuator means.

24. The exposure control mechanism of claim 21 wherein said actuator means includes:
an articulated arm assembly pivotal about said given axis and having latching means for effecting said engagement with said shutter blade means; and
spring means for urging said arm assembly to move from said terminal to said initial position.

25. The exposure control mechanism of claim 24 wherein said resilient means is configured and arranged to impart a bias upon said latching means for urging said latching means into said shutter blade means engagement.

26. The exposure control mechanism of claim 24 wherein said actuator means further includes camming means for isolating said latching means from said shutter blade means during said movement from said initial to said terminal position.

27. The exposure control mechanism of claim 24 including arm member means mounted for rotation about an axis remote from said given axis and being configured to support a camming surface engageable with said latching means during said movement from said initial to said terminal position.

28. The exposure control mechanism of claim 21 wherein said shutter blade means is configured to contact said actuator means when said actuator means is in said initial position and said shutter blade means is in said rest position so that the return motion of said shutter blade means from said open to said rest position may be damped at said rest position.

29. The exposure control mechanism of claim 28 including stationary contact means for restricting the movement of said shutter blade means when said actuator means is moved from said initial toward said terminal position.

* * * * *